Patented Jan. 1, 1946

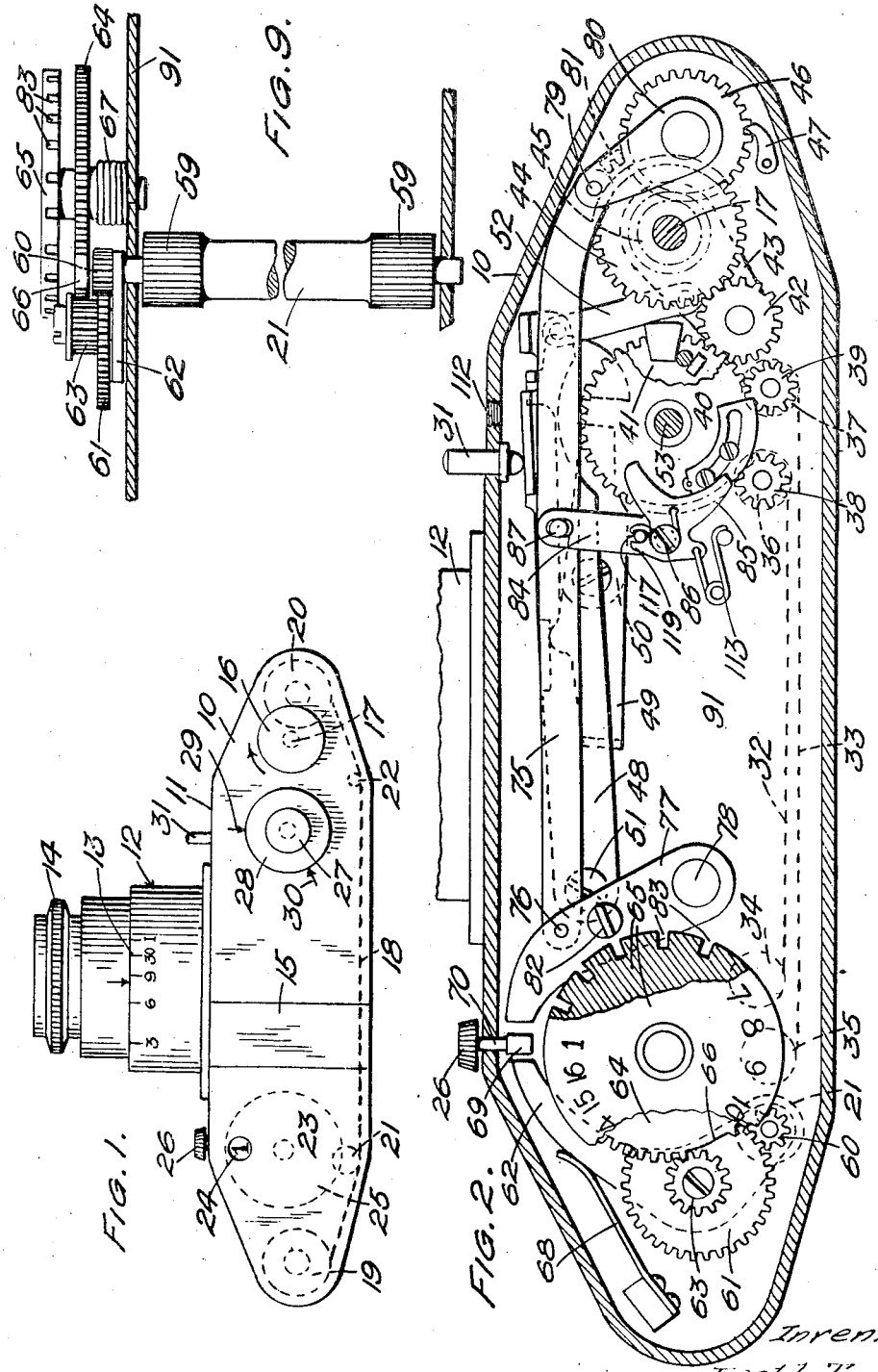

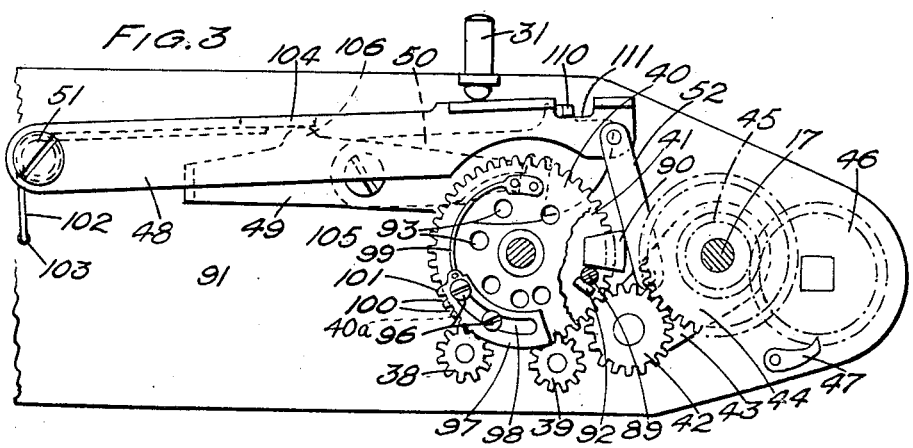
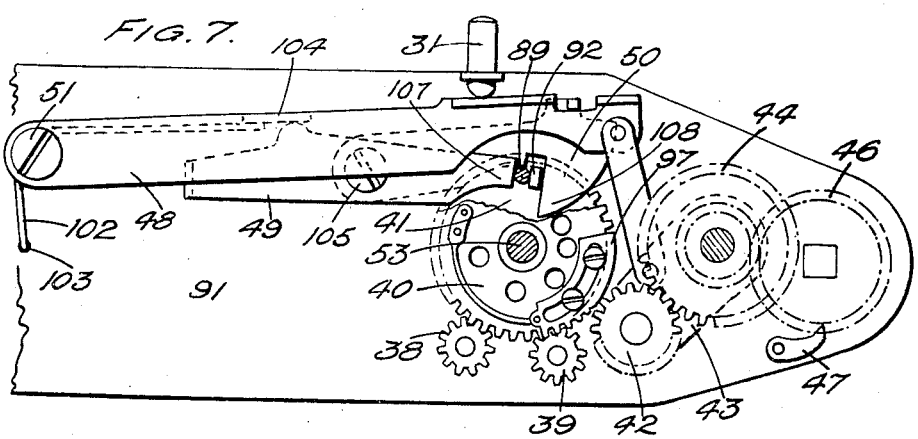
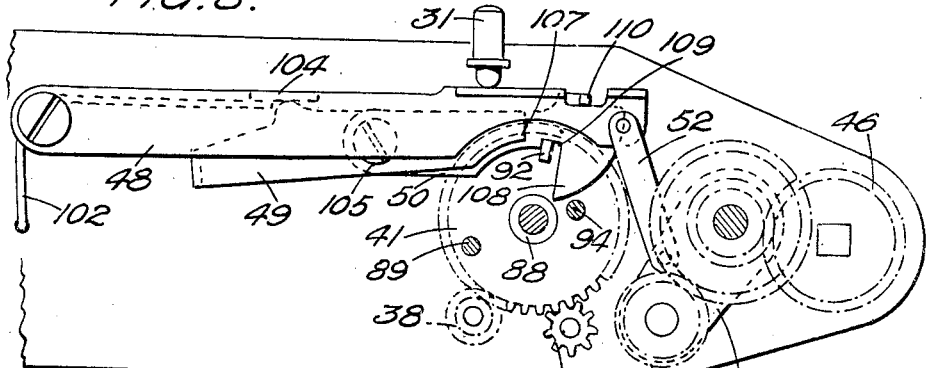

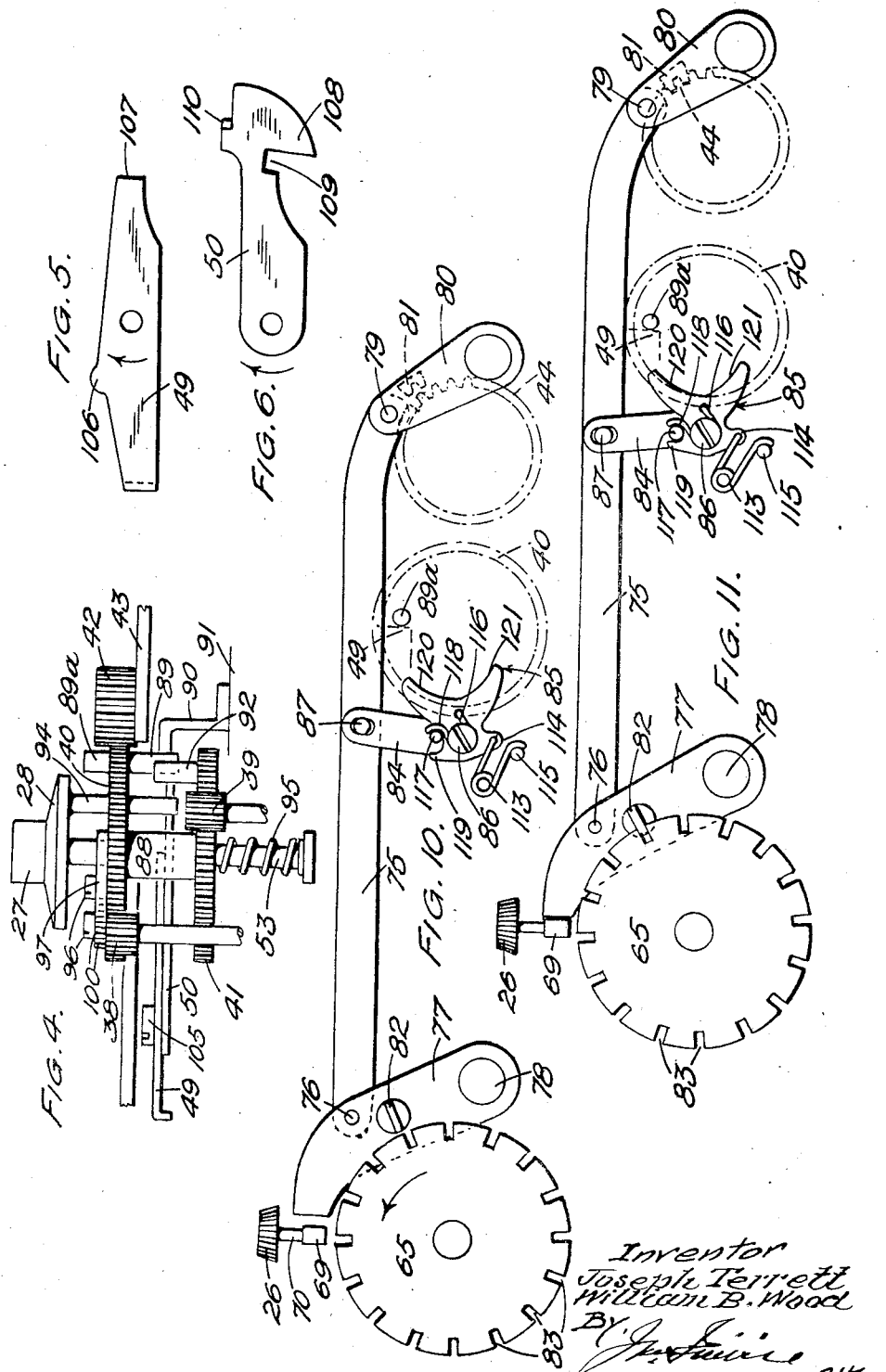

2,392,071

UNITED STATES PATENT OFFICE 2,392,071

CAMERA SHUTTER

Joseph Terrett and William Barton Wood, Sutton, England, assignors to Purma Cameras Limited, Sutton, England Application April 3, 1943, Serial No. 481,766
In Great Britain November 26, 1941

10 Claims. (Cl. 95—57)

This invention relates to cameras and especially to those having shutters which require to be wound or set in readiness for making each exposure. The term "winding" is used broadly in this specification in connection with the shutter to denote the operation by which the energy which is required to make the shutter perform the exposing action, is imparted to and stored in a spring or like resilient device in readiness for the release of the shutter. The "winding" of the shutter may be performed by other than a rotary motion.

It is an object of the present invention to provide an improved and relatively simple form of shutter mechanism which can readily be combined with the film-winding mechanism of a roll film camera whereby the operations of setting the shutter and winding the film may be performed simultaneously by the actuation of a single member.

It is a further object of the invention to provide an improved form of shutter and film winding mechanism incorporating locking means adapted to arrest automatically the winding of the film when the "picture" area required for the next exposure has been brought into position, the action of releasing the shutter to make the exposure being adapted to bring said locking means back into operation.

According to one aspect of the invention, there is provided a camera shutter in which a pair of meshing gear wheels, used for winding the shutter, are urged resiliently into engagement so as to slip when the driven wheel reaches a predetermined position, wherein the driven gear wheel is provided with a deflector member which is movable circumferentially relative to said driven gear wheel and which acts to move the gear wheels apart out of mesh when the driven gear wheel reaches the said predetermined position during the winding of the shutter. This mechanism can advantageously be provided in conjunction with a shutter of the roller-blind type, preferably one which is arranged to operate just in front of the focal plane of the camera.

In a roll film camera having a shutter which requires winding prior to operation, according to a further feature of the invention winding of the film also winds the shutter through gearing, the arrangement being such that when the shutter is fully wound, slip is permitted to enable the winding movement of the film to be completed.

There is further provided according to the invention a roll film camera comprising in combination a common winding member serving to wind simultaneously both the shutter and the film, releasing means for the shutter, indicating means responsive to the extent to which the film is wound, and interlocking means, which restrict movement of the winding member, are unlocked by release of the shutter, and are controlled by the indicating means.

As a still further aspect of the invention a roll film camera having a shutter with winding means is characterised by the fact that said winding means serves also to wind the film and includes a pair of meshing gear wheels urged resiliently into engagement, the driven gear wheel being provided with a deflector member which is movable circumferentially relative to the said driven wheel and which acts to move the gear wheels apart out of mesh when the driven gear wheel reaches a predetermined position.

The invention is illustrated by way of example in the accompanying diagrammatic drawings, in which:

Figure 1 is a plan of an improved roll film camera;

Figure 2 is a sectional plan drawn to an enlarged scale and showing the general arrangement of the shutter and film winding mechanism, together with automatic interlocking means;

Figure 3 is a diagram showing in plan the mechanism used for winding the shutter, the latter being in its "released" position;

Figure 4 is a rear elevation of the shutter mechanism, the spacing of the parts being exaggerated to show the action more clearly;

Figure 5 is a plan of the first latch member;

Figure 6 is a plan of the second latch member;

Figure 7 is a view corresponding to Figure 3, but showing the position occupied by the parts when the shutter has been fully wound but the film winding is as yet incomplete;

Figure 8 is a similar view with the shutter in process of being released to give an "instantaneous" exposure;

Figure 9 is a rear sectional elevation of the indicating mechanism;

Figure 10 is a plan of the interlocking means, the parts being shown in the positions which they occupy when the shutter has been wound, but the film winding is incomplete; and Figure 11 is a similar view with the winding mechanism locked, the camera thus being ready for the next exposure to be made.

The roll film camera shown in Figure 1 comprises a hollow body 10 having fitted to its front wall 11 a lens mounting 12 of the focussing type, the focussing scale being indicated at 13 and the usual lens aperture adjusting ring at 14. A direct vision view finder is conveniently provided at 15. A knob 16 mounted upon a spindle 17 is rotatable in the direction shown by the arrow so as to wind the shutter and simultaneously wind the film so as to bring the next "picture" area of the film into position for exposure. The film itself is indicated in dotted lines at 18 and passes in the usual way from a "supply" film spool 19 to a "receiving" film spool 20, said film 18 first running in driving engagement against a roller 21 belonging to indicating mechanism, which will be hereinafter described, while adjacent the other end of the camera a fixed or rotatable guide roller 22 is provided in the usual manner. In the top 23 of the camera body 10 a window or opening 24 is provided through which the appropriate numeral upon an indicating disc 25 is rendered visible so as to show to the user how many times the film has been wound forward for the purpose of making exposures. The indication through the window 24 can be returned to "1" by operating a knob 26, as will be hereinafter explained. Also fitted to the top of the camera body 10 is a speed setting knob 27 for use in regulating the exposure time again by the shutter; an annular flange 28 is marked with a scale which can be read in conjunction with an index 29 when the shutter is unwound or with an index 30 when the shutter is in a wound condition. The usual shutter releasing plunger is indicated at 31.

The general arrangement of the internal mechanism is shown diagrammatically in Figure 2 and will now be described briefly; the arrangement and operation of the various sections of the mechanism will be more clearly understood from the description appertaining to the succeeding figures. The usual two spring roller blinds, which together constitute the shutter of the self-capping focal plane type, are indicated at 32 and 33; the usual spring rollers belonging to these blinds are indicated at 34 and 35 and the winding rollers at 36 and 37 respectively. The rollers 36 and 37 are wound by means of pinions 38 and 39, which respectively mesh with a pair of gear wheels 40 and 41 the former being partly broken away in Figure 2. The gear wheels 40 and 41 are rotatable independently of one another upon a spindle 53, which latter carries the speed setting knob 27 and is also independently rotatable; it is also freely slidable in an axial direction. In normal mesh with the upper gear wheel 40 is a "driving" gear wheel 42 carried by the free end of an angularly movable arm 43, which latter is pivoted freely about the axis of the spindle 17 carrying the winding knob 16 (Figure 1). There are two gear wheels securely fastened to the spindle 17, namely an upper gear wheel 44 in permanent mesh with the gear wheel 42 and a smaller lower gear wheel 45 which is in permanent mesh with a gear wheel 46, the latter being arranged to drive the receiving film spool 20 (Figure 1). A ratchet pawl 47 urged into engagement with the gear wheel 46 by a spring (not shown) serves to prevent unwinding of the spool 20 and also has a holding action on the shutter blinds 32 and 33 while these are being wound. Means for releasing the shutter comprise briefly a releasing lever 48, a first latch member 49 and a second latch member 50; the general shapes of the latch members 49 and 50 are shown more clearly in Figures 5 and 6 respectively. The releasing lever 48 is pivoted at 51, while its other end co-operates with the release plunger 31 and is also connected by a link 52 with the arm 43 so as to throw the driven gear wheel 42 out of mesh with the gear wheel 40 when the plunger 31 is depressed.

The indicator roller 21 at the left-hand side of the camera body 10 is of the form shown in Figure 9, its two end portions 59 being slightly enlarged and being knurled to engage frictionally with the surface of the film at the upper and lower margins thereof. On its spindle the roller 21 has a pinion 60 which meshes with a gear wheel 61 mounted for free rotation upon an arm 62; this arm is itself mounted freely upon the spindle of the roller 21 and pinion 60. Fastened to the gear wheel 61 is a gear wheel 63 arranged to mesh with a gear wheel 64 fastened beneath the indicator disc 65 (see also Figure 9). A few of the teeth of the gear wheel 64 are cut away, as indicated at 66, so that when the gear wheel 64 and indicator disc 65 have been driven through nearly one complete revolution in the anti-clockwise direction by the gear wheel 63 the latter reaches the cutaway portion 66 and therefore ceases to drive the gear wheel 64. The above-mentioned anti-clockwise rotation of the disc 65 and gear wheel 64 takes place against the action of a coiled spring 67 (Figure 9); thus the disc 65 can be caused to return automatically to its original "1" position by moving the arm 62 to the left against the action of a spring, consequently disengaging the gear wheel 63 and allowing the spring 67 to return the disc 65. Movement of the arm 62 is effected by a cam 69 of oval or other elongated shape (which is seen "end-on" in Figure 2) said cam being formed at the inner end of the spindle 70 of the knob 26.

The mechanism further includes an interlocking device which will hereinafter be more fully described in connection with Figures 10 and 11. Referring to Figure 2, however, it comprises briefly a bar 75 which has its left-hand end pivotally connected at 76 to an arm 77 adapted to swing freely about a stud 78. The opposite end of the bar 75 is pivoted at 79 to a locking arm 80 mounted for free rotation about the axis of the gear wheel 46. The locking arm 80 is provided upon its underneath with a dog 81 of somewhat V-shaped cross-section, said dog being arranged to be moved into engagement with the teeth of the gear wheel 44 so as positively to prevent rotation of said gear wheel 44 and the winding knob 16. A dog upon the arm 77 co-operates in a similar manner with a series of notches 83 cut in the underneath part of the circumference of the disc 65, as will be clear from Figure 9. A bifurcated cam member 85 pivotally mounted upon a screw 86 is arranged to be deflected by the operation of the shutter and moves angularly an intermediate arm 84 which is independently mounted upon the screw 86 and is coupled by a pin and slot connection 87 with the bar 75.

The general arrangement and operation of the shutter will be understood more clearly by reference to Figures 3 to 8 in conjunction with the following explanation. The upper gear wheel 40 and the lower gear wheel 41 are mounted coaxially, as will be seen more clearly in Figure 4, said wheels being free to revolve independently and for convenience being mounted loosely upon the spindle 53 with a spacing washer 88 between them. Figure 4 shows clearly how the pinion 38 for winding the front blind 32 is in permanent mesh with the wheel 40, while the corresponding pinion 39 belonging to the rear blind 33 is similarly in constant mesh with the lower gear wheel 41. It should be mentioned that the spacing of the parts in a vertical direction has been considerably exaggerated in Figure 4 for clarity, but in practice said parts fit together to form a very compact assembly having but little total depth. A peg 89 (shown in section in Figures 2 and 3) is mounted firmly in the upper gear wheel 40 and projects downwards therefrom for engagement with a stop member 90 secured to a plate 91 upon which the greater part of the mechanism shown in Figure 2 is mounted (see also Figure 9); the peg 89 also co-operates with a second peg 92 projecting upwards from the lower gear wheel 41. The upper gear wheel 40 is formed with a series of holes 93 which are disposed at a uniform radius but are spaced circumferentially at such intervals as to correspond with the periods of "instantaneous" exposure which the shutter is desired to make. Any one of these holes can be engaged by a pin 94 secured to the flange 28 of the speed-setting knob 27, the arrangement being such that when the knob 27 is lifted against the action of a coiled compression spring 95 the pin 94 is released from the upper gear wheel 40 so that the knob 27 can then be rotated and the pin 94 inserted in the desired one of the holes 93. The function of this pin 94 is to release the second blind, as will be explained hereinafter.

Mounted on top of the upper gear wheel 40 by means of a pair of shouldered screws 96 is a quadrant-shaped deflector member 97 having an arcuate slot 98 adapted to slide upon the screws 96. The member 97 is urged normally in an anticlockwise direction by the free end of a curved wire spring 99, which latter has its other end fastened to the gear wheel 40. At its leading end (i. e. the end which leads during the winding of the shutter, when the wheel 40 is rotated clockwise) the deflector member 97 is formed with a few spaced notches 100 serving to define gear teeth between them. When the deflector member 97 is in its normal position (i. e. with the leading end of the slot 98 in engagement with the corresponding screw 96) the first gear tooth, indicated at 101, registers exactly with one of the teeth of the gear wheel 40; the next few gear teeth of the wheel 40 (i. e. those beneath the deflector member 97) are, however, cut completely away, as indicated by the broken line at 40a in Figure 3. Owing to the fact that the full movement of the gear wheel 40 is only about three-quarters of a revolution, this cut-away part 40a of the gear wheel 40 never comes into register with the pinion 38. It will be noted that the notches 100 in the deflector member 97 progressively decrease in depth, and after a short distance fade out completely, so that beyond that point the outer curved surface of the deflector member 97 lies in register with the tips of the teeth of the gear wheel 40.

The release lever 48, which is pivoted upon the screw 51, is normally urged forwards into engagement with the release plunger 31 by means of a coiled spring 102 having one limb anchored to the plate 91 at 103. The other limb of this spring bears against a lug 104 which is bent downwards from the release lever 48 and which serves normally as a stop for the first latch member 49. The latter, which is pivoted to the base plate 91 by means of a screw 105, is urged to move angularly about the screw 105 in a clockwise direction by means of a light spring (not shown), said first latch member 49 being provided with a rounded projection 106 for engagement with the lug 104. The opposite end of the latch member 49 is flat, as indicated at 107 in Figure 5. The second latch member 50 is of the shape shown in Figure 6 and has a nose 108, a notch 109, and an upwardly directed tail 110; the member 50 is also urged resiliently so as to tend to move about the screw 105 in a clockwise direction under the action of a light spring (also not shown). It will be seen from Figure 3 that this tail 110 is normally arranged to bear against a cut-away portion 111 of the release lever 48, but as the force of the spring belonging to the latch member 50 is relatively light, it is unable to shift the release lever 48 by overcoming the spring 102.

The operation of the shutter is as follows. When the shutter is in a released condition the parts occupy the positions shown in Figure 3. The peg 89 of the upper gear wheel 40 is in engagement with the stop member 90, while the peg 92 of the lower gear wheel 41 is in engagement with the lower end of the peg 89, as will be seen also in Figure 4. To prepare the camera for the next exposure the winding knob 16 (Figure 1) is turned in a clockwise direction, thus correspondingly rotating the spindle 17. This has a two-fold action; firstly it causes the gear wheel 45 to drive the gear wheel 46 in an anti-clockwise direction, thus commencing to wind up the film, and secondly it causes the gear wheel 44 to rotate the driving gear wheel 42 in an anti-clockwise direction, thus in turn rotating the upper gear wheel 40 in a clockwise direction. It will be seen that the spring 102 of the release lever 48 acts through the link 52 so as to pull upon the arm 43 and maintain the gear wheel 42 in firm driving contact with the gear wheel 40; the direction of the drive also has this effect. It will be noted that the peg 89 of the upper gear wheel 40 causes the lower gear wheel 41 to be rotated in unison with the wheel 40 as it engages the peg 92 upon said lower gear wheel. As winding proceeds the parts reach the positions shown in Figure 7. The pegs 89 and 92 are in engagement with the first latch member 49 and have slipped beyond the square end 107 thereof, the peg 92 being adjacent the nose 108 of the second latch member 50. It will be understood that the driving gear wheel 42 continues to rotate as the film is wound and it is therefore necessary for the drive to be imparted to the wheel 40 only up to the precise instant when the pegs 89 and 92 reach the nose 108. It is for this reason that the deflector plate 97 is slidable upon the screws 96. Thus, as the winding of the shutter comes to an end with the peg 92 engaging the nose 108, the driving gear wheel 42 has its teeth in mesh with the first few teeth of the deflector plate 97, and also in register with the gap 40a in the teeth of the wheel 40. Therefore continued rotation of the wheel 42 is not impeded by the wheel 40, but instead the deflector plate 97 is moved by the driving gear wheel 42 to the position shown in Figure 7; the teeth of the gear wheel 42 can then slide idly upon the ungrooved part of the deflector member 97. The mechanism is so designed that when the shutter is in its fully wound condition, as shown in Figure 7, it will always be necessary to wind the film a little further in order to bring the next "picture area" into position, even when the end part of the film is being used, and in consequence the effective diameter of the receiving film spool 20 is relatively large. Therefore the winding of the knob 16 is continued until it is brought to a standstill by the interlocking means, as will be hereinafter explained. During this additional winding, however, the gear wheel 42 rotates, but its teeth slip upon the curved surface of the deflector member 97, or at least upon that part of the member where the notches 100 are exceedingly shallow. The gear wheel 40 is of course prevented from rotating further by the nose 108 of the latch 50, so that the deflector member 97 slides forward upon the screws 96 to the extent necessary in order to allow the slipping of the gear wheel 42 to occur. By adopting this arrangement the wear on the parts is exceedingly small, the gear wheel 40 can remain absolutely steady, and at the same time the further winding of the film can take place with an exceptionally smooth action. If the operator should let go of the knob 16 when the shutter is partly wound but the pegs 89 and 92 have not reached their final positions shown in Figure 7, then the pawl 47 prevents the shutter mechanism from returning under the influence of the spring rollers 34 and 35 of the blinds.

Assuming that the shutter is set to make an "instantaneous" exposure, the effect which occurs when the release plunger 31 is depressed is shown in Figure 8. It will be seen that the release lever 48 is moved in a rearward direction (i. e. downwards in the drawings), and the first effect of this is to push upon the link 52, thus moving the arm 43 angularly and disengaging the gear wheel 42 from the upper gear wheel 40 including the deflector member 97. Then the lug 104 of the release lever moves the first latch member 49 in an anti-clockwise direction about the axis of the screw 105. Thus the flat end 107 moves clear of the peg 89 (the upper gear wheel 40 is omitted from Figure 8, the peg 89 and the pin 94, both of which are carried by the wheel 40, being shown in section), the gear wheel 40 consequently being free to rotate rapidly in an anti-clockwise direction as a result of the force imparted to it by the front blind 32 through the medium of the pinion 38, which is indicated in dotted lines in Figure 8. The peg 92 belonging to the lower gear wheel 41 is unable to follow suit, however, as the rearward movement of the release lever 48 enables the second latch member 50 also to move in a rearward direction under the influence of its spring, the tail 110 following up the movement of the release lever 48. Therefore the notch 109 catches the peg 92 and holds it in the position shown in Figure 8. When the front blind has travelled a predetermined distance, depending upon the position selected for the pin 94, the latter strikes the right-hand rounded surface of the nose 108 of the second latch member 50, thus causing the latter to be deflected forwardly, its tail 110 leaving the release lever 48. This movement, of course, frees the peg 92 belonging to the lower gear wheel 41 so that said gear wheel is able to return to its released position at the same time under the force imparted to it by the rear blind 33. When the front blind 32 finishes its travel the peg 89 has, of course, reached the stop 90 and shortly afterwards the peg 92 similarly regains its released position, as shown in Figure 3. Each of the blinds 32 and 33 is formed with the usual aperture (not shown) which corresponds in size to the picture area; these two apertures are arranged so that the aperture of the front blind 32 is in register with the picture area when the shutter is in its released position, and on the contrary the aperture in the rear blind 33 is in register with the picture area when the shutter is fully wound. The actual time for which the film is exposed is regulated by varying the effective width of the exposure slit in the blinds as is common practice with focal plane shutters. If the pin 94 is a long way in front of the peg 89, then the second blind 33 is released soon after the first blind 32 and the overlap of the apertures in the blinds is small, giving a short exposure. On the other hand by shifting the pin 94 backwards (in a clockwise direction) towards the peg 89 the exposure is lengthened owing to the increased width of the slit. The travel of each of the blinds is arranged so that the apertures are out of register with one another during the winding operation, thus rendering the shutter "self-capping."

For "brief" exposures one of the holes 93 is so positioned that when the pin 94 is disposed therein it only reaches the position shown in Figure 8 by the time that the peg 89 engages the stop 90. Therefore the second latch member 50 continues to remain operative so long as the release plunger 31 is depressed. It will be seen that in these circumstances the front blind 32 makes its full travel immediately the plunger 31 is depressed, thus bringing its aperture into register with the picture area; in the meantime the rear blind 33 is still fully wound, so that its aperture is also in register with the picture area and the film is therefore exposed over its whole picture area so long as the plunger 31 remains depressed. As soon, however, as the operator lets go of the plunger 31 the release lever 48 moves forward under the action of its spring 102, thus causing the second latch member 50 to be moved forwards by its tail 110 out of engagement with the peg 92. Therefore the lower gear wheel 41 is free to rotate anti-clockwise, thus allowing the rear blind 33 to assume its released position, and consequently masking the picture area of the film. Thus the shutter opens fully as soon as the release plunger is depressed and remains open until such time as said plunger is released by the operator. Extended time exposures can be obtained by providing a clasp or the like (not shown) for the plunger 31, said clasp being adapted to hold said plunger in the depressed condition. Alternatively a flexible cable release of the usual type (not shown) can be inserted within a screw-threaded aperture 112 formed in the body 10 (see Figure 2) so that the central plunger or wire of said release co-operates with the release lever 48. Suitable locking means can be provided on such a cable release for the purpose of holding the latter in its depressed or operating condition and thus effecting "time" exposures of any desired duration.

The action of the interlocking mechanism will now be described with particular reference to Figures 2, 10 and 11. The bifurcated cam member 85 is rockable within limits on the screw 86 from one operative position which is shown in Figure 2 to a second operative position which is shown in Figures 10 and 11. The cam member 85 is held firmly in each of these positions by a somewhat U-shaped wire spring 113, one limb of which is turned over at its end to engage pivotally with a perforated lug 114 formed on the cam member 85; the other limb bears against an abutment pin 115. It will be seen that, as the arms of the spring 113 tend to move apart, said spring is arranged to urge the cam member 85 in either direction away from its dead-centre position, thereby holding said cam member relatively firmly in either of its two operative positions, as mentioned above. A second and weaker wire spring 118 is coiled around the screw 86, and has one end 116 anchored to the cam member 85, while its other end bears against a thrust pin 117 secured to the intermediate arm 84, the arrangement being such that the spring 118 tends to move the intermediate arm 84 angularly towards the left about the screw 86. The cam member 85 is provided with a stop projection 119, which is arranged to co-operate with the thrust pin 117 (see Figure 11). The arms of the cam member 85 are indicated at 120 and 121; they are inclined to one another somewhat in the manner of the arms of a Y, their internal surface being smoothly curved to the form shown. This surface is arranged to be engaged by a peg 89a, which projects above the upper gear wheel 40 and constitutes a continuation of the depending peg 89 (see Figure 4). Thus the peg 89a, in rotating with the wheel 40, is able to flick the cam member 85 from one operative position to the other during the use of the shutter. As previously mentioned, the dog 82 on the arm 77 is arranged to engage with any one of the notches 83 in the indicator disc 65, and when the interlocking mechanism is in the appropriate position but there is no notch 83 in register with the dog 82, then said dog merely rides against the curved circumferential surface between a pair of notches 83. It will also be remembered that the dog 81 on the arm 80 is adapted to engage with the teeth of the gear wheel 44 and thus prevent the rotation of the latter when the dog 82 is engaged with a notch 83.

The action of the interlocking mechanism is as follows. After an exposure has been made by the release of the shutter the parts are in the positions shown in Figure 2. It will be noted that the cam member 85 is in its rearmost operating position and that the stop projection 119 is in engagement with the thrust pin 117, thus urging the intermediate arm 84 to the right and holding both of the dogs 82 and 81 in their inoperative positions owing to the action of the dead-centre spring 113. As the shutter is wound by operation of the knob 16, the gear wheel 40 is rotated in a clockwise direction so that the peg 89a, upon the top of the wheel 40 moves alongside the arm 121 of the cam member 85 and then engages the surface of the arm 120 of said cam member, which surface is oblique to, and crosses the path of, the peg 89a. This shifts the cam member 85 to the position shown in Figure 10. When the shutter is fully wound, of course, the peg 89a occupies a position just beyond the flat end of the first latch member 49, as shown. The movement of the cam member 85 to its forward position shifts the stop projection 119 and therefore allows the intermediate arm 84 to move as far as it can towards the left under the influence of the relatively weak spring 118. Although the film is being wound simultaneously with the shutter, at the time when the cam member 85 is moved to the position shown in Figure 10 the next picture area of the film will not have arrived in position ready for exposure; nevertheless the indicator disc 65 will have moved an appreciable distance (corresponding to the distance which the film has moved) and therefore the dog 82 will be unable to return to its original notch 83. As a consequence it merely rests lightly upon the circumference of the indicator disc 65 and so holds the dog 81 out of engagement with the gear wheel 44, the parts then being in the positions indicated in Figure 10. As winding of the film proceeds the indicator disc 65 continues to rotate, and at the instant when the next picture area is in position, the next notch 83 reaches the dog 82, which latter drops into said notch under the action of the spring 118. This brings the dog 81 into engagement with the teeth of the gear wheel 44 and so prevents further rotation of the winding knob 16. When the shutter is released to make the next exposure, the gear wheel 40 rotates anti-clockwise, as above described, and the peg 89a, carried thereby slides against the arm 121 of the cam member 85, thus deflecting outwards the arm 121 thereof and returning the cam member 85 to the position shown in Figure 2. During this movement of the cam member 85 the stop projection 119 engages the thrust pin 117, and causes the intermediate arm 84 and the bar 75 to be moved to the right, so disengaging the dogs 81 and 82 from the gear wheel 44 and the indicator disc 65, respectively.

At the beginning of a daylight loading roll film package, as at present supplied, is a length of paper backing strip which has to be wound on to the receiving spool 20 so as to bring the first picture area of the film into the correct position for exposure. In order to prevent interference by the interlocking mechanism while this is being done, the knob 26 is turned through a right angle from the position shown in the figures, thus causing the cam 69 to spread apart the adjacent ends of the lever 62 and arm 77, for it will be remembered that the cam 69 is of elongated shape. This movement of the lever 62 to the left disengages the pinion 63 from the gear wheel 64, thus allowing the spring 67 to return the indicator disc 65 to its "1" position (if necessary). Thus as the said backing strip is drawn forward it turns idly the roller 21 and the gear wheels 61, 63. The action of the cam 69 on the arm 77 is to hold the dogs 81 and 82 positively out of engagement with the gear wheel 44 and indicator disc 65, respectively; as the shutter is being wound the cam member 65 is, of course, moved to its forward position (as in Figures 10 and 11) thus stressing the spring 118, which latter urges the dogs 81 and 82 into the engaged positions as soon as the knob 26 is turned to bring the cam 69 to its normal position when the first picture area of the film is in its proper position for exposure. Similarly, when the last exposure has been made, the knob 26 is again turned through a right angle to release the interlocking means and enable the roll film to be fully wound and removed from the camera; at the same time the release of the lever 62 automatically returns the indicator disc 65 to its "1" position. If desired the cam 69 can be so shaped that when turned in one direction from its normal position it moves the arm 77 to disengage the interlocking means in order to enable the film to be wound into its starting position, or wound off; when turned to its other position, the cam 69 would move the lever 62 so as to enable the indicator disc 65 to return to its "1" position.

It will be apparent that the winding of the film serves to wind the shutter through the gear wheels 44, 42 and 40 and that the shutter is completely wound by the time that the pegs 89 and 92 reach the nose 50 as shown in Figure 7. Up to this point it is necessary that the gear wheel 40 be positively rotated to the stated position, and at this point the wheels must separate so that further rotation of the driving gear wheel will take place freely. Heretofore the means for securing this result is to cut away several of the teeth of the wheel as 40 at the required position, but it will be appreciated that under such an arrangement the last tooth of the wheel 40 would receive very rough treatment from the driving gear wheel 42, for said last tooth would be urged by the springs of both blinds into rubbing engagement with the driving wheel 42 during the continued rotation of said wheel. While this difficulty might be avoided by the use of a deflector plate fixedly mounted on the driven gear wheel 40, such arrangement would of necessity disengage the gear wheels gradually so that it would not be certain that the pegs 89 and 92 would just reach the nose 50 and then stop precisely, at the same time permitting the driving gear wheel 42 to continue in operation. If, as in the present invention, the deflector plate 97 is made separate from the gear wheel 40, and mounted to be movable circumferentially, it is possible for the whole of the unmeshing of the gear teeth to take place after the rotation of the wheel 40 itself has ceased. This ensures that the wheel 40 is moved decisively to bring the pegs 89 and 92 into engagement with the nose 50 before the deflector plate comes into action, moving the wheels apart.

It will be understood that the construction and arrangement of roll film camera which has been described is given merely by way of example and that various modifications can be made to suit requirements. For instance, the interlocking mechanism can be omitted, if desired, and the form of shutter described can be used on various forms of camera, including those of the reflex type, with or without the combined film winding mechanism, and the film-actuated mechanical indicating device. Such an indicating device, however, has the advantage that, after the film has once been wound to bring the first picture area into position for exposure, using the usual non-actinic window in the back of the camera, the indicator can be set to its "1" position, and thereafter said window can remain covered until the next film is being inserted. The mechanical indicator is, of course, used as a guide to show when each successive picture area has been fully wound into position, that is in cases where automatic interlocking mechanism is not provided.

What we claim is:

1. A camera shutter comprising a pair of apertured roller blinds arranged to be wound against spring influence with the apertures out of register, the apertures in the blinds being arranged so that they both register with the "picture" area when the first blind is completely released and the second blind is fully wound, a pair of meshing gear wheels for winding said blinds, means urging said gear wheels into engagement with one another, which means act resiliently so as to allow the wheel axes to move apart and the driving wheel to slip when the driven wheel reaches a predetermined position, a deflector member which is mounted slidably upon the driven gear wheel so as to move circumferentially relative thereto and which, when the driven gear wheel reaches the said predetermined position during the winding of the shutter, is engaged by the driving gear wheel, and is moved thereby relative to the driven gear wheel to shift the axes of the gear wheels apart and unmesh the teeth thereof, a projection operated by the first blind, and a pair of latch members, the first of which holds both blinds until it is moved to its released position, whereupon the second latch member holds the second blind until the said second latch member is moved to release the second blind, provision being made for the projection to be positioned so that, even after the full travel of the first blind has taken place, said projection does not reach the second latch member, so that after the first latch member has been released the shutter remains fully open until the second latch member is released manually.

2. In a camera shutter as defined in claim 1, wherein apertured spring roller blinds are arranged to be wound and released one after the other to produce an exposure, the provision of exposure-setting means comprising a projection which releases the second blind and which is constituted by the tip of a release pin, which latter is adapted to be inserted into any one of a series of holes formed in a wheel at positions which are equi-distant from the centre of said wheel.

3. A camera as claimed in claim 1, wherein winding means for the roller blinds comprises an angularly movable arm, a driving gear wheel carried by said arm, a driven gear wheel, resilient means urging the arm so that the driving gear wheel meshes with the driven gear wheel, and means connecting the arm with the release member whereby the said gear wheels are completely disengaged when the release member is operated to release the shutter.

4. In a camera shutter, winding mechanism comprising a driving gear wheel, a driven gear wheel, resilient means acting to urge the axes of the driving and driven gear wheels towards one another to bring their teeth into mesh, a deflector member mounted upon the driven wheel to have limited circumferential movement relative thereto, said deflector member being arranged to overlap the teeth of the driven gear wheel and having an operative surface which is engageable by the teeth of the driving gear as the driven gear wheel reaches a predetermined position in the winding of the shutter, and the teeth of the driven gear wheel being cut away to form a gap overlapped by the deflector member, whereby the driving gear wheel rotates the driven gear wheel until the latter reaches the said predetermined position, continued rotation of the driving gear wheel causing the deflector member to move circumferentially around the driven gear wheel and at the same time shift the driving gear wheel in a direction away from the axis of the driven gear wheel.

5. A camera shutter as defined in claim 4, wherein the operative surface of the deflector member is formed with a series of notches defining gear teeth, that notch first engaged by the driving gear wheel during the winding of the shutter being substantially equal in size to the teeth of the driven gear wheel and successive notches being reduced in depth so as to lead the driving gear wheel smoothly into engagement with an un-notched part of the said operative surface.

6. A camera shutter as defined in claim 4, wherein the deflector member comprises a plate having an arcuate slot concentric with the axis of the driven gear wheel, a pair of pins projecting from said driven gear wheel being in engagement with said slot.

7. A camera shutter as defined in claim 4, including a spring mounted upon the driven gear wheel to urge the deflector member to a normal inoperative position.

8. A camera shutter as defined in claim 4, including an arm carrying the driving gear wheel so as to enable said driving gear wheel to move towards and away from the driven gear wheel, the resilient means acting upon said arm to move the driving gear wheel into mesh with the driven gear wheel, the axis of which latter is fixed.

9. In a camera shutter, a pair of meshing gear wheels which are used for winding the shutter, means for urging said gear wheels into engagement, which means act resiliently so as to allow the wheel axes to move apart and the driving wheel to slip when the driven wheel reaches a predetermined position, and a deflector member which is mounted upon the driven gear wheel so as to move circumferentially relative thereto and which, when the driven gear wheel reaches the said predetermined position during the winding of the shutter, is engaged by the driving gear wheel, and is moved thereby relative to the driven gear wheel to shift the axes of the gear wheels apart and un-mesh the teeth thereof.

10. A camera shutter comprising a pair of overlapping spring roller blinds, each formed with an aperture, a pair of meshing gear wheels for winding said blinds, means urging said gear wheels into engagement with one another, which means act resiliently so as to allow the wheel axes to move apart and the driving wheel to slip when the driven wheel reaches a predetermined position corresponding to the full winding of the blinds, and a deflector member which is mounted slidably upon the driven gear wheel so as to move circumferentially relative thereto and which, when the driven gear wheel reaches the said predetermined position during the winding of the shutter, is engaged by the driving gear wheel and is moved thereby relative to the driven gear wheel to shift the axes of the gear wheels apart and un-mesh the teeth thereof.

JOSEPH TERRETT.
WILLIAM BARTON WOOD.